United States Patent
Zhang

(10) Patent No.: US 10,244,099 B2
(45) Date of Patent: Mar. 26, 2019

(54) METHOD AND DEVICE FOR DETERMINING STATUS OF TERMINAL, AND TERMINAL

(71) Applicant: GUANGDONG OPPO MOBILE TELECOMMUNICATIONS CORP., LTD., Dongguan, Guangdong (CN)

(72) Inventor: Haiping Zhang, Dongguan (CN)

(*) Notice: Subject to any disclaimer, the term of this patent is extended or adjusted under 35 U.S.C. 154(b) by 0 days.

(21) Appl. No.: 15/845,960

(22) Filed: Dec. 18, 2017

(65) Prior Publication Data

US 2018/0262610 A1   Sep. 13, 2018

(30) Foreign Application Priority Data

Mar. 7, 2017  (CN) .......................... 2017 1 0132539

(51) Int. Cl.
| | |
|---|---|
| *H04M 1/725* | (2006.01) |
| *G01S 15/08* | (2006.01) |
| *H04M 1/60* | (2006.01) |
| *H04W 52/02* | (2009.01) |

(52) U.S. Cl.
CPC ......... *H04M 1/72569* (2013.01); *G01S 15/08* (2013.01); *H04M 1/6008* (2013.01); *H04M 1/6016* (2013.01); *H04R 2460/13* (2013.01); *H04W 52/027* (2013.01); *Y02D 70/144* (2018.01); *Y02D 70/26* (2018.01)

(58) Field of Classification Search
CPC ........................... H04M 1/72569; G01S 15/08
USPC ........................................................ 455/566
See application file for complete search history.

(56) References Cited

U.S. PATENT DOCUMENTS

| | | | | |
|---|---|---|---|---|
| 2014/0028823 | A1* | 1/2014 | Tahk ...................... | G06F 21/32 348/77 |
| 2014/0337036 | A1* | 11/2014 | Haiut ..................... | G06F 1/3265 704/275 |

FOREIGN PATENT DOCUMENTS

| | | |
|---|---|---|
| CN | 102984372 A | 3/2013 |
| CN | 103369142 A | 10/2013 |
| CN | 103385795 A | 11/2013 |
| CN | 104459703 A | 3/2015 |
| CN | 106210356 A | 12/2016 |
| CN | 106231103 A | 12/2016 |
| CN | 106303023 A | 1/2017 |
| CN | 106331233 A | 1/2017 |
| CN | 106339106 A | 1/2017 |
| CN | 106453960 A | 2/2017 |
| CN | 106851013 A | 6/2017 |

(Continued)

OTHER PUBLICATIONS

European Patent Application No. 17207003.9, Extended European Search and Opinion dated May 17, 2018, 15 pages.

(Continued)

*Primary Examiner* — Ayodeji O Ayotunde
(74) *Attorney, Agent, or Firm* — Lathrop Gage LLP

(57) ABSTRACT

Embodiments of the present disclosure provide a method and a device for determining a status of a terminal and a terminal. The method includes: transmitting, by a bone-conduction acoustic generator, a detection signal outwards; receiving, by a microphone, a reflection signal of the detection signal reflected by an external object; obtaining a distance between the terminal and the external object according to the detection signal and the reflection signal; and determining the status of the terminal in relative to the external object based on the distance.

20 Claims, 5 Drawing Sheets

(56) References Cited

FOREIGN PATENT DOCUMENTS

| EP | 1816829 A1 | 8/2007 |
|---|---|---|
| JP | H09154085 A | 6/1997 |

OTHER PUBLICATIONS

Taiwan Patent Application No. 10720075130, Office Action dated Jan. 23, 2018, 8 pages.
PCT/CN2017/116470, English translation of International Search Report and Written Opinion dated Feb. 24, 2018, 10 pages.

\* cited by examiner

METHOD AND DEVICE FOR DETERMINING STATUS OF TERMINAL, AND TERMINAL

CROSS REFERENCE TO RELATED APPLICATION

This application is based on and claims priority of Chinese Patent Application No. 201710132539.6 filed on Mar. 7, 2017, the entire contents of which are incorporated herein by reference.

FIELD

The present disclosure relates to a field of terminal technology, and more particularly to a method and a device for determining a status of a terminal and a terminal.

BACKGROUND

Smart phones are increasingly popular with the development of smart terminal technology. When a user makes a call through the smart phone, his face may often touch a screen of the smart phone. In this case, when a call hang-up key or a speaker key in the screen is touched mistakenly, some unnecessary interference may be cased.

In order to prevent the above interference, the smart phone is generally provided with a proximity sensor inside by a phone provider to determine a status of the smart phone. The proximity sensor transmits an infrared light pulse outwards and determines whether an object is in proximity based on an amount of energy of the infrared light received by an infrared photosensitive diode. Furthermore, in order to improve a transmittance of the infrared light pulse, it requires arranging a hole in a non-displaying region of the smart phone, thereby causing a low screen-to-body ratio of the smart phone.

SUMMARY

Embodiments of the present disclosure provide a method for determining a status of a terminal. The method includes:

transmitting, by a bone-conduction acoustic generator, a detection signal outwards;

receiving, by a microphone, a reflection signal of the detection signal reflected by an external object;

obtaining a distance between the terminal and the external object according to the detection signal and the reflection signal; and determining the status of the terminal in relative to the external object based on the distance.

Embodiments of the present disclosure further provide a device for determining a status of a terminal, including a processor, a bone-conduction acoustic generator, a microphone, a cover plate and a housing.

The housing and the cover plate form an accommodating cavity. The bone-conduction acoustic generator and the microphone are arranged inside of the accommodating cavity.

The bone-conduction acoustic generator is configured to transmit a detection signal outwards.

The microphone is configured to receive a reflection signal of the detection signal reflected by an external object.

The processor is configured to determine a status of the terminal in relative to the external object according to the detection signal and the reflection signal.

BRIEF DESCRIPTION OF THE DRAWINGS

In order to make technical solutions in embodiments of the present disclosure more apparent, drawings required in descriptions of the embodiments will be described below. Obviously, the drawings described below are only some embodiments of the present disclosure, and other drawings can be obtained according these drawings by those skilled in the art without creative labors.

DETAILED DESCRIPTION

Figure 1:
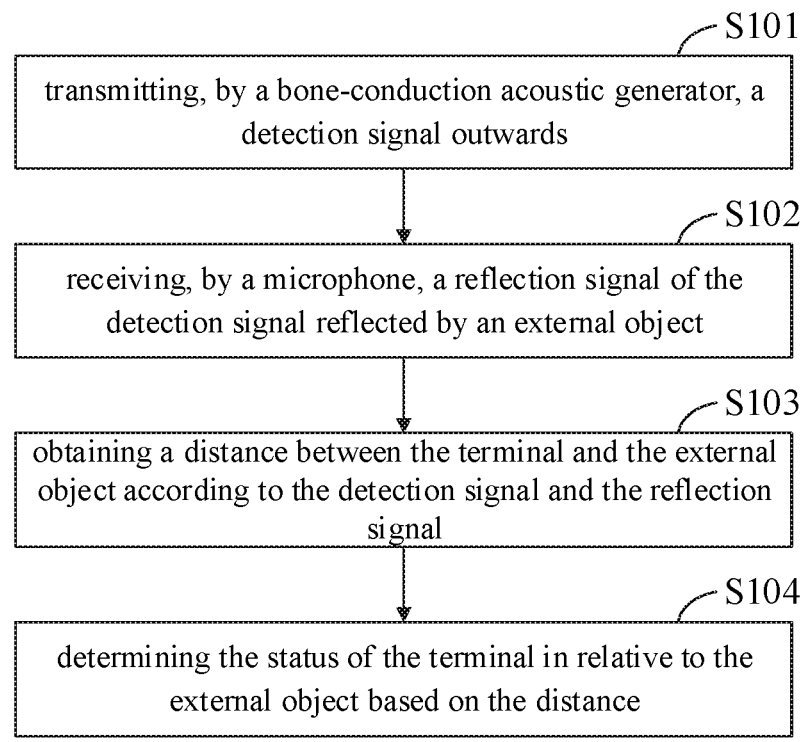
FIG. 1 is a flow chart illustrating a method for determining a status of a terminal according to embodiments of the present disclosure.

The technical solutions in embodiments of the present disclosure will be described clearly and completely with reference to accompanying drawings in the embodiments of the present disclosure. Apparently, embodiments described are only a part of embodiments of the present disclosure, but not all embodiments. All other embodiments obtained by those skilled in the art without creative labors based on the embodiments in the present disclosure shall fall in the protection scope of the present disclosure.

Terms such as "first", "second", "third" and "fourth" in the description are used to distinguish different objects from each other and are not intended to indicate a particular sequence. Furthermore, terms "comprising" and "having" and variants thereof are intended to cover and are not exclusive. For example, a process, a method, a system, a product or a device containing a sequence of blocks or a series of modules are not limited to the listed blocks or modules. They alternatively include blocks or modules that are not listed, or alternatively further include other inherent blocks or modules of the process, the method, the product or the device.

The term "embodiment" referred in the description means that, specific features, structures, or characteristics described in combination with embodiments may be contained in at least one embodiment of the present disclosure. The appearances of the phrase "embodiment" in various places throughout this specification are not necessarily referring to the same embodiment of the present disclosure, or exclusionary embodiments or alternative embodiments. It is to be understood implicitly or explicitly by those skilled in the art that, embodiments of the present disclosure may be combined with other embodiments.

An executing body of a method for determining a status of a terminal provided in embodiments of the present disclosure may be a device for determining a status of a terminal provided in embodiments of the present disclosure, or may be a terminal integrated with a device for determining a status of a terminal. The device for determining a status of a terminal may be implemented via software or hardware. The terminal described in embodiments of the present disclosure may be a mobile device, such as a smart phone (such as Android phone, Windows Phone and the like), a tablet computer, a palmtop computer, a notebook computer, a mobile Internet device (MID), a wearable device, or the like. The above are merely examples but are not exhaustive. The terminal includes, but is not limited to, the above examples.

Embodiments of the present disclosure provide a method and a device for determining a status of a terminal and a terminal, which will be separately described below.

In an embodiment, it may be described from a perspective of the device for determining a status of a terminal. The device for determining a status of a terminal may be integrated into a terminal in a form of software or hardware. The terminal may be a device, such as a smart phone, a tablet computer and the like.

Referring to FIG. 1, FIG. 1 is a flow chart illustrating a method for determining a status of a terminal according to embodiments of the present disclosure. Blocks included in the method for determining a status of a terminal will be described in detail below.

In block 101, a detection signal is transmitted outwards by a bone-conduction acoustic generator.

Figure 2:
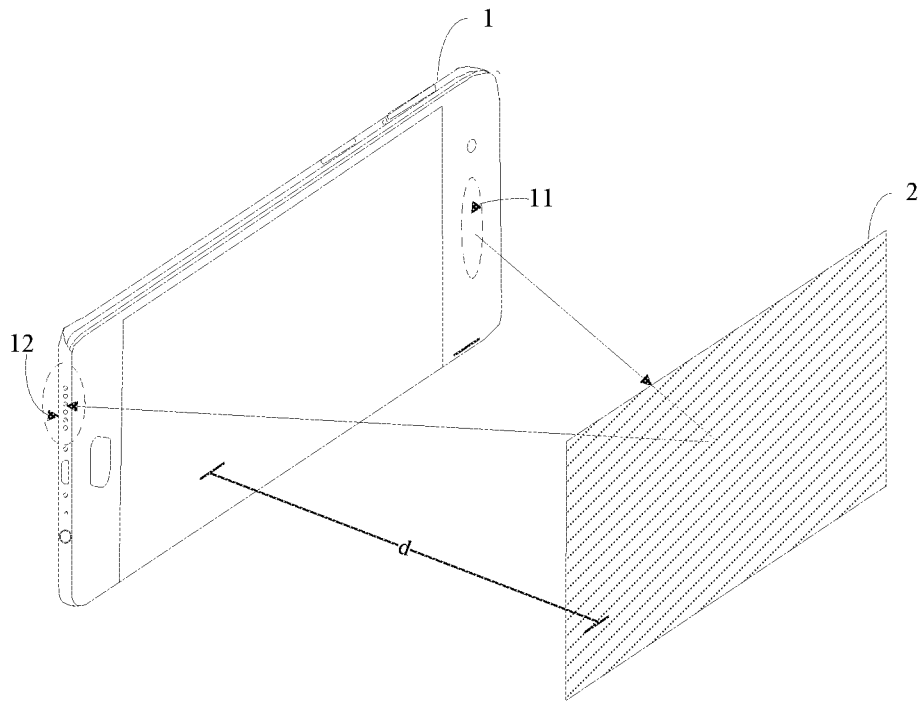
FIG. 2 is a schematic diagram illustrating a scene for a method for determining a status of a terminal according to embodiments of the present disclosure.

The bone-conduction acoustic generator is configured to transmit an ultrasonic detection signal outwards. The ultrasonic detection signal is configured to measure a distance between the terminal and an external object so as to determine the status of the terminal in relative to the external object according to the distance. As illustrated in FIG. 2, a bone-conduction receiver 11 is arranged in a region enclosed by dashed lines at top of a smart phone 1. When it needs to detect the status of the terminal, the detection signal is transmitted outwards by the bone-conduction receiver 11. As the ultrasonic has a higher transmittance, it does not need to arrange a hole in the region enclosed by dashed lines at top of the smart phone 1. Therefore, a screen-to-body ratio of the smart phone 1 may be improved.

In block 102, a reflection signal of the detection signal reflected by the external object is received by a microphone.

The detection signal is reflected back to be the reflection signal when being blocked by the external object. The reflection signal is received by the microphone arranged inside the terminal. As illustrated in FIG. 2, the detection signal transmitted from the bone-conduction receiver 11 of the smart phone 1 is reflected back to be the reflection signal after being blocked by the external object 2. The reflection signal is received by the microphone 12 arranged in a bottom rim of the smart phone 1.

In block 103, a distance between the terminal and the external object is obtained according to the detection signal and the reflection signal.

A transmitting time $t_1$ of the detection signal and a receiving time $t_2$ of the reflection signal are obtained to obtain a difference $t_2-t_1$ between the detection signal and the reflection signal. It is assumed that a velocity of the ultrasonic is v, the distance between the terminal and the external object may be obtained as $s=v*(t_2-t_1)$.

In block 104, the status of the terminal in relative to the external object is determined based on the distance.

In some embodiments, the status of the terminal in relative to the external object may include a proximity status and a far status. A preset distance threshold is set firstly, and the obtained distance is compared to the preset distance threshold. When the obtained distance is smaller than the preset distance threshold, it is determined that the terminal is in the proximity status. When the obtained distance is not smaller than the preset distance threshold, it is determined that the terminal is in the far status. As such, functions of a proximity sensor in the related art may be achieved, while due to a higher transmittance of the ultrasonic, it does not require arranging a hole on a cover plate of the terminal. Compared with a conventional terminal having an infrared proximity sensor for detecting the status of the terminal, the screen-to-body ratio of the terminal may be improved in the embodiments of the present disclosure. As illustrated in FIG. 2, there is no need to arrange a hole for transmitting or receiving a signal through the proximity sensor at top of the smart phone.

Figure 3:
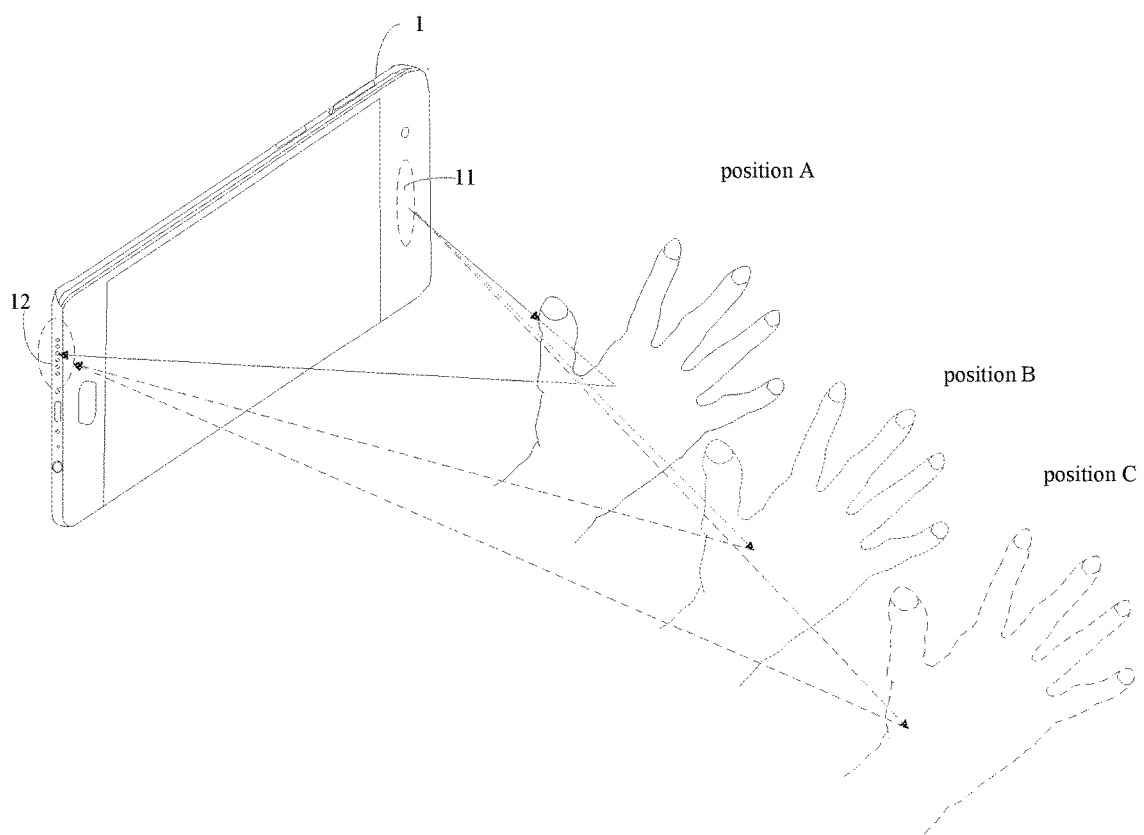
FIG. 3 is a schematic diagram illustrating another scene for a method for determining a status of a terminal according to embodiments of the present disclosure.

In some embodiments, a plurality of statuses may be set according to the distance between the terminal and the external object. For example, a first status is set when the distance is from 1 centimeter to 5 centimeters. A second status is set when the distance is from 6 centimeters to 10 centimeters. A third status is set when the distance is from 11 centimeters to 15 centimeters, and so on. For different statuses, respective adjustment parameters are set to adjust the terminal. It is assumed that the adjustment parameter is a brightness value, the first status corresponds to a first brightness value, the second status corresponds to a second brightness value, the third status corresponds to a third brightness value, and the first brightness value<the second brightness value<the third brightness value. As illustrated in FIG. 3, when a hand moves from a position A to a position B and then to a position C, a brightness value of the screen of the terminal may be gradually increased.

The method for determining a status of a terminal according to embodiments employs a solution that by transmitting the detection signal through the bone-conduction acoustic generator, by receiving the reflection signal through the microphone, and by obtaining the distance between the terminal and the external object according to the detection signal and the reflection signal, the status of the terminal in relative to the external object is determined according to the distance. Furthermore, the screen-to-body ratio is improved.

Figure 4:
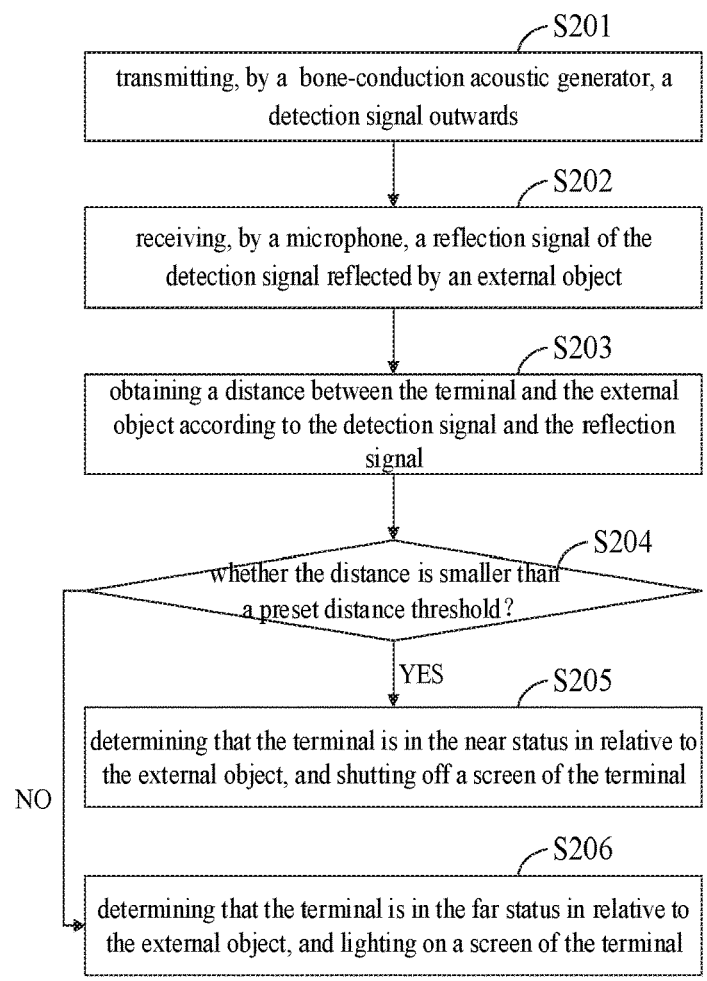
FIG. 4 is a flow chart illustrating another method for determining a status of a terminal according to embodiments of the present disclosure.

Referring to FIG. 4, FIG. 4 is a flow chart illustrating another method for determining a status of a terminal according to embodiments of the present disclosure. Blocks included in the method for determining a status of a terminal will be described in detail below.

In block 201, a detection signal is transmitted outwards by a bone-conduction acoustic generator.

The bone-conduction acoustic generator is configured to transmit an ultrasonic detection signal outwards. The ultrasonic detection signal is configured to measure a distance between the terminal and an external object so as to determine the status of the terminal in relative to the external object according to the distance. As illustrated in FIG. 2, a bone-conduction receiver 11 is arranged in a region enclosed by dashed lines at top of a smart phone 1. The detection signal is transmitted outwards by the bone-conduction receiver 11 when it requires detecting the status of the terminal. As the ultrasonic has a higher transmittance, it does not require arranging a hole on a cover plate of the terminal. Therefore, compared with a conventional terminal having an infrared proximity sensor for detecting the status of the terminal, a screen-to-body ratio of the terminal is improved in the embodiments of the present disclosure. As illustrated in FIG. 2, there is no need to arrange a hole for transmitting or receiving a signal through the proximity sensor at top of the smart terminal.

In block 202, a reflection signal of the detection signal reflected by the external object is received by a microphone.

The detection signal is reflected back when being blocked at the external object. The reflection signal is received by the microphone arranged inside the terminal. As illustrated in FIG. 2, the detection signal transmitted from the bone-conduction receiver 11 of the smart phone 1 is reflected at the external object 2 to be the reflection signal. The reflection signal is received by the microphone 2 arranged in a bottom rim of the smart phone 1.

In block 203, a distance between the terminal and the external object is obtained according to the detection signal and the reflection signal.

A transmitting time $t_1$ of the detection signal and a receiving time $t_2$ of the reflection signal are obtained to obtain a difference $t_2-t_1$. It is assumed that a velocity of the ultrasonic is v, the distance between the terminal and the external object may be obtained as $d=v*(t_2-t_1)$.

In block 204, it is determined whether the distance is smaller than a preset distance threshold.

In some embodiments, the status of the terminal in relative to the external object may include a proximity status and a far status. The preset distance threshold is set firstly. The obtained distance is compared to the preset distance threshold. When the obtained distance is smaller than the preset distance threshold, a block 205 is performed. When the obtained distance is not smaller than the preset distance threshold, a block 206 is performed.

The preset distance threshold may be set according to a particular scenario. For example, when the smart phone is used for making a call and the smart phone is in the proximity status in relative to ears of the user, a screen darkening operation is required to be operated to the smart phone so as to save the amount of electricity of the smart phone. The preset distance threshold may be set to be a smaller value, such as 1 cm, 2 cm, 3 cm or the like. For another example, when an instant messaging application on the smart phone is used for a chat in voice, the preset distance threshold may be set to be a larger value, such as 5 cm, 6 cm, 7 cm or the like. In conclusion, the preset distance threshold may be set on demand, which is not limited in embodiments of the present disclosure.

In block 205, when the distance is smaller than the preset distance threshold, it is determined that the terminal is in the proximity status in relative to the external object, and the screen of the terminal is darkened.

Regardless of the smart phone being used for making a call or the instant messaging application being used for the chat in voice, the distance being smaller than the preset distance threshold indicates that the terminal is in the near state in relative to the external object, such as ears, mouth and the like. Thus, it does not require watching the screen of the terminal by the user, and the screen of the terminal may be darkened, such that the amount of electricity of the terminal may be saved.

In block 206, when the distance is not smaller than the preset distance threshold, it is determined that the terminal is in the far status in relative to the external object, and the screen of the terminal is lighted.

The distance being not smaller than the preset distance threshold indicates that the terminal is in the far status in relative to the external object, such as ears, mouth and the like. In this case, when the user desires to watch the screen of the terminal or operate the terminal, such as watching a picture displayed on the terminal while making a call, or viewing chat records after sending a voice message, the screen of the terminal may be lighted, thereby facilitating user's operation.

In some embodiments, a plurality of statuses may be set according to the distance of the terminal in relative to the external object. For example, a first status is set when the distance is from 1 centimeter to 5 centimeters. A second status is set when the distance is from 6 centimeters to 10 centimeters. A third status is set when the distance is from 11 centimeters to 15 centimeters and so on. For different statuses, respective adjustment parameters are set for adjusting the terminal. It is assumed that the adjustment parameter is a brightness value. The first status corresponds to a first brightness value, the second status corresponds to a second brightness value, the third status corresponds to a third brightness value, and the first brightness value<the second brightness value<the third brightness value. These statuses, brightness values and relationships between the statuses and the brightness values are stored for example in a database.

After obtaining the distance of the terminal in relative to the external object in block 203, a target status corresponding to the distance is searched in the terminal. The status of the terminal in relative to the external object is set as the target status. A brightness value corresponding to the target status is obtained and the brightness value of the screen of the terminal is adjusted to the brightness value corresponding to the target status.

As illustrated in FIG. 3, it is assumed that the terminal is in the first status in relative to a hand when the hand is at a position A, the terminal is in the second status when the hand is at a position B, and the terminal is in the third status when the hand is at a position C. During a movement of the hand from the position A to the position B and further to the position C, the brightness value of the screen of the terminal may be adjusted from the first brightness value to the second brightness value, and further to the third brightness value, thereby improving the brightness value of the screen of the terminal gradually.

The method for determining a status of a terminal according to embodiments of the present disclosure employs a solution that by transmitting the detection signal through the bone-conduction acoustic generator, by receiving the reflection signal through the microphone, and by obtaining the distance between the terminal and the external object according to the detection signal and the reflection signal, the status of the terminal in relative to the external object is determined. Furthermore, the screen-to-body ratio of the terminal is improved.

Figure 5A:
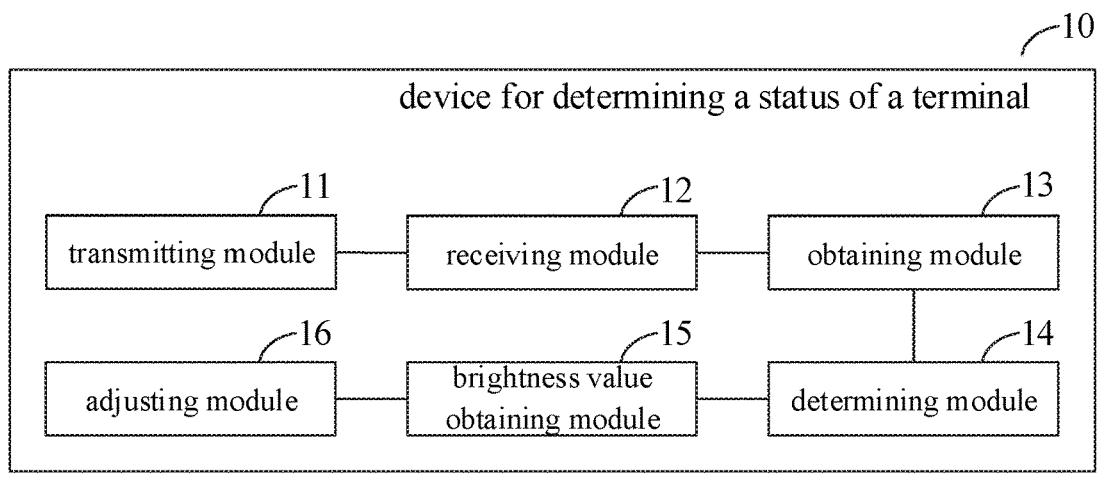
FIG. 5a is a block diagram illustrating a device for determining a status of a terminal according to embodiments of the present disclosure.

In order to better implement the above method, an embodiment provides a device for determining a status of a terminal. The device for determining a status of a terminal may be integrated into a terminal. The terminal may be a device, such as a smart phone, a tablet computer or the like. As illustrated in FIG. 5a, the device 10 for determining a status of a terminal includes a transmitting module 11, a receiving module 12, an obtaining module 13 and a determining module 14.

The transmitting module 11 is configured to transmit a detection signal outwards through a bone-conduction acoustic generator. The receiving module 12 is configured to receive a reflection signal of the detection signal reflected at an external object through a microphone. The obtaining module 13 is configured to obtain a distance between the terminal and the external object according to the detection signal and the reflection signal. The determining module 14 is configured to determine the status of the terminal in relative to the external object according to the distance.

In some embodiments, the device 10 is configured to transmit an ultrasonic detection signal through the transmitting module 11 outwards. The detection signal is configured to measure a distance between the terminal and the external object. The reflection signal of the detection signal reflected at the external object is received through the receiving module 12. The obtaining module 13 is configured to obtain a transmitting time $t_1$ of the detection signal and a receiving time $t_2$ of the reflection signal, and to calculate a different $t_2-t_1$. It is assumed that a velocity of the ultrasonic is v, the obtaining module 13 may obtain the distance $s=v*(t_2-t_1)$ between the terminal and the external object.

Figure 5B:
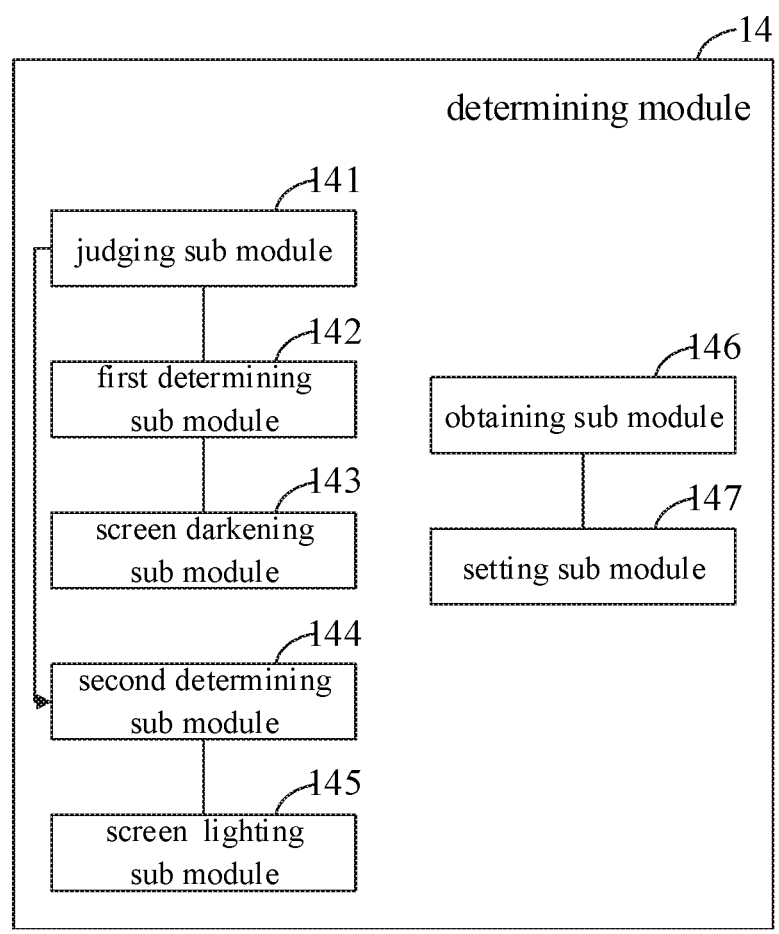
FIG. 5b is a block diagram illustrating a determining module of a device for determining a status of a terminal according to embodiments of the present disclosure.

In some embodiments, the status includes a proximity status and a far status. As illustrated in FIG. 5b, the determining module 14 includes a judging sub module 141, a first determining sub module 142, a screen darkening sub module 143, a second determining sub module 144 and a screen lighting sub module 145.

The judging sub module 141 is configured to judge whether the distance is smaller than a preset distance threshold. The first determining sub module 142 is configured to determine that the terminal is in the proximity status in relative to the external object, when the distance is smaller than the preset distance threshold. The screen darkening sub module 143 is configured to darken a screen of the terminal. The second determining sub module 144 is configured to determine the terminal is in the far status in relative to the external object, when the distance is not smaller than the preset distance threshold. The screen lighting sub module 145 is configured to light a screen of the terminal.

In some embodiments, the status of the terminal in relative to the external object may include a proximity status and a far status. A preset distance threshold is set firstly, and the obtained distance is compared to the preset distance threshold by the judging sub module 141. When the obtained distance is smaller than the preset distance threshold, the first determining sub module 142 determines that the terminal is in the proximity status. Further, the screen darkening sub module 143 darkens the screen of the terminal. When the obtained distance is not smaller than the preset distance threshold, the first determining sub module 142 determines that the terminal is in the far status. Further, the screen lighting sub module 145 lights the screen of the terminal. As such, functions of a proximity sensor in the related art may be achieved, while due to a higher transmittance of the ultrasonic, it does not require arranging a hole on a cover plate of the terminal. Compared with a conventional terminal having an infrared proximity sensor for detecting the status of the terminal, the screen-to-body ratio of the terminal may be improved in the embodiments of the present disclosure. As illustrated in FIG. 2, there is no need to arrange a hole for transmitting or receiving a signal through the proximity sensor at top of the smart phone.

In some embodiments, as illustrated in FIG. 5b, the determining module 14 includes an obtaining sub module 146 and a setting sub module 147.

The obtaining sub module 146 is configured to obtain a target status corresponding to the distance.

The setting sub module 147 is configured to set the status of the terminal in relative to the external object as the target status.

In some embodiments, as illustrated in FIG. 5a, the device 10 for determining a status of a terminal further includes a brightness value obtaining module 15 and an adjusting module 16.

The brightness value obtaining module 15 is configured to obtain a brightness value corresponding to the target status.

The adjusting module 16 is configured to adjust a brightness value of a screen of the terminal to the brightness value corresponding to the target status.

In some embodiments, a plurality of statuses may be set according to the distance between the terminal and the external object. For example, a first status is set when the distance is from 1 centimeter to 5 centimeters. A second status is set when the distance is from 6 centimeters to 10 centimeters. A third status is set when the distance is from 11 centimeters to 15 centimeters, and so on. For different statuses, respective adjustment parameters are set to adjust the terminal. It is assumed that the adjustment parameter is a brightness value, the first status corresponds to a first brightness value, the second status corresponds to a second brightness value, the third status corresponds to a third brightness value, and the first brightness value<the second brightness value<the third brightness value.

As illustrated in FIG. 3, when a hand moves from a position A to a position B and then to a position C, the obtaining sub module 146 obtains a distance between the terminal and the hand at the position A, a distance between the terminal and the band at the position B, and a distance between the terminal and the hand at the position C, and to obtain respective statuses corresponding to the distances. The setting sub module 147 sets respective statuses as the target statuses. The brightness value obtaining module 15 obtains respective brightness values corresponding to the target statuses. The adjusting module 16 adjusts the brightness values of the screen of the terminal to the brightness values corresponding to the target statues, thereby increasing the brightness value of the screen of the terminal gradually.

The device for determining a status of a terminal according to embodiments of the present disclosure employs employ a solution that by transmitting the detection signal through the bone-conduction acoustic generator, by receiving the reflection signal through the microphone, by obtaining the distance between the terminal and the external object according to the detection signal and the reflection signal, the status of the terminal in relative to the external object is determined. Furthermore, the screen-to-body ratio of the terminal is improved.

Figure 6:
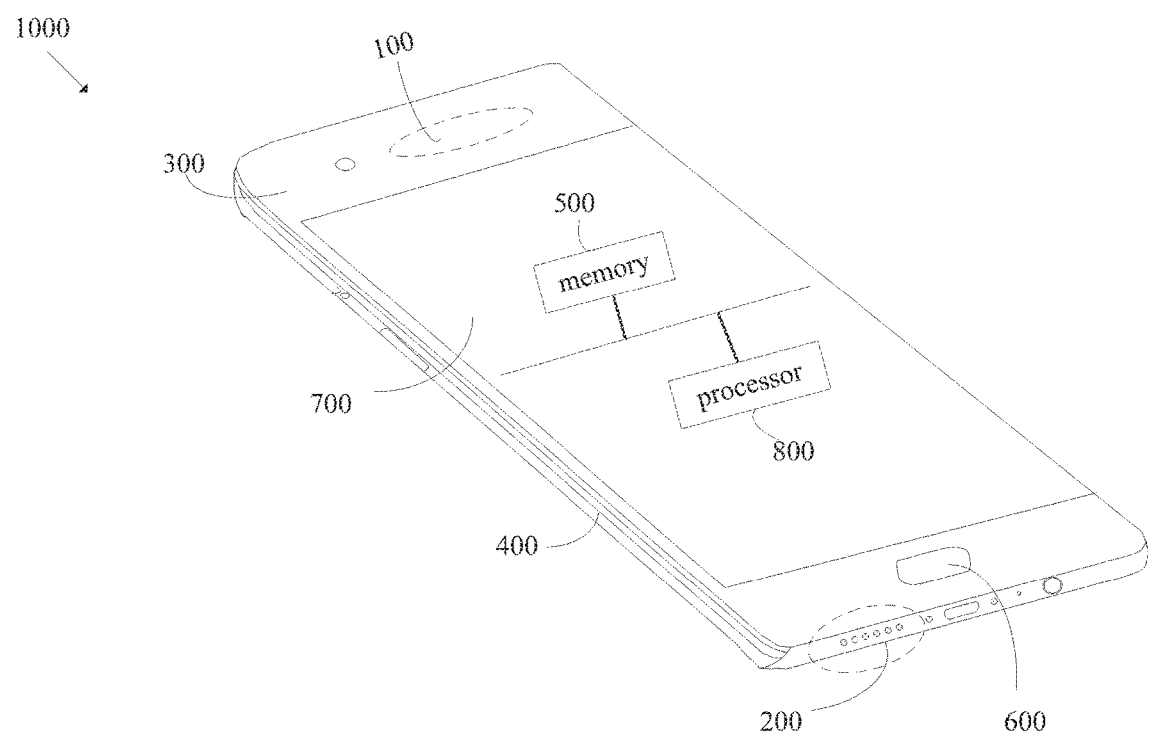
FIG. 6 is a block diagram illustrating a terminal according to embodiments of the present disclosure.

Referring to FIG. 6, FIG. 6 is a block diagram illustrating a terminal according to embodiments of the present disclosure. The terminal 1000 includes a bone-conduction acoustic generator 100, a microphone 200, a cover plate 300 and a housing 400. The housing 400 and the cover plate 300 form an accommodating cavity. The bone-conduction acoustic generator 100 and the microphone 200 are arranged an inside of the accommodating cavity. From a view angle outside the terminal, the bone-conduction acoustic generator 100 and the microphone 200 are invisible, such that they are depicted with dashed lines. The bone-conduction acoustic generator 100 is configured to transmit a detection signal outwards. The microphone 200 is configured to receive a reflection signal of the detection signal reflected at an external object.

As illustrated in FIG. 6, the bone-conduction acoustic generator 100 is arranged below the top of the cover plate 300 of the terminal. In some embodiments, the bone-conduction acoustic generator 100 may be a bone-conduction receiver arranged inside the terminal. In some embodiments, the bone-conduction acoustic generator 100 may also be arranged below the center of the cover plate 300 of the terminal or other regions. Due to a higher transmittance of the ultrasonic, there is no need to arrange a hole on the cover plate 300 of the terminal, thereby improving a screen-to-body ratio compared with a conventional infrared proximity sensor for determining the status of the terminal.

The microphone 200 is arranged below the bottom of the cover plate 300 of the terminal. There is a hole arranged at a bottom rim of the cover plate 400 corresponding to the microphone 200, such that the microphone 200 receives the reflection signal through the hole.

In some embodiments, the terminal 100 further includes one or more memory 500, such as computer-readable storage medium, an inputting unit 600, a displaying unit 700 and a processor 800 having one or more processing cores. It may be understood by those skilled in the art, the structure of the terminal illustrated in FIG. 6 is not intended to limit the terminal. The terminal of embodiments of the present disclosure may include less or more components or may be combined with some components or have different component arrangements.

The memory 500 is configured to store software programs or modules. The processor 800 is configured to execute various functional applications or process data by running the software programs or modules stored in the memory 500. The memory 500 may mainly include a program stored region and a data stored region. The program stored region may store an operation system, at least one target application required by functions (such as a voice player function, an image player function and the like). The data stored region may store data (such as audio data, a telephone book and the like) generated by the terminal when the terminal is used. Furthermore, the memory 500 may further include a memory controller, such that the processor 800 and the inputting unit 600 may access to the memory 500.

The inputting unit 600 is configured to receive a figure or character information, and generate keyboard signal input, mouse signal input, operating arm signal input, optical signal input or trackball signal input related to user settings and functional controlling. In some embodiments, the inputting unit 600 may include touch sensitive surfaces or other input devices. The touch sensitive surface may include a touch sensing device and a touch controller. The touch sensing device is configured to sense an orientation of the user, to sense a signal generated by the touch, and to send the signal to the touch controller. The touch controller is configured to receive touch information from the touch sensing device and to convert the touch information into touch point coordinates, to send the touch point coordinates to the processor 800, and to receive and execute a command received from the processor 800.

The displaying unit 700 may be configured to display information inputted by the user or information provided to the user, or various graphic user interface of the terminal. The graphic user interface may be consisted of graphs, text, icons, videos and other combinations. Further, the touch sensitive surface may cover a display panel. When a touch operation on or near the touch sensitive surface is detected, the processor 800 is informed of the touch to determine the type of the touch event. Thereafter, the processor 800 is configured to provide corresponding visual output on the displaying panel according to the type of the touch event.

The processor 800 is a control center of the terminal, by utilizing various interfaces and wires to connect respective parts of the terminal, running or executing the software programs and/or modules stored in the memory 500, invoking the data stored in the memory 500, executing various functions of the terminal and processing the data, so as to monitor the whole terminal. Alternatively, the processor 800 may include one or more processing cores. Alternatively, the processor 800 may be integrated with an application processor or a modem controller. The application processor is mainly configured to process the operation system, the user interface, the target application and the like. The modem controller is mainly configured to process wireless communication. It may be understood that, the model processor may not be integrated into the processor 800.

The terminal may further include a power supply (such as a battery) for providing power to various components. Alternatively, the power supply may be connected to the processor 800 via a power management system, such that the functions, such as charging, discharging or power consumption management may be managed by the power management system. The power supply may further includes one or more DC or AC power supply, a recharging system, a power fault detection circuit, a power supply switcher or a converter, a power supply state indicator or other components.

Although not shown, the terminal 100 may further include a sensor module, a Bluetooth module, a camera and the like, which is not elaborated herein.

Specifically, in embodiments, the terminal 100 transmits the detection signal outwards via the bone-conduction acoustic generator 100. The detection signal forms the reflection signal when being blocked by the external object and the reflection signal is received by the microphone 200. During this process, the processor 800 is configured to perform a statistic to a difference between a transmitting time of the detection signal transmitted by the bone-conduction acoustic generator 100 and a receiving time of the reflection signal received by the microphone 200, so as to calculate the distance between the terminal and the external object. In some embodiments, the processor 100 is further configured to start a timer when an ultrasonic detection signal is transmitted though the bone-conduction acoustic generator 100 outwards and to stop the timer when the reflection signal is received by the microphone 200. Further, the processor 800 is configured to obtain the distance by multiplying the obtained time with the velocity of the ultrasonic wave.

The processor 800 is configured to compare the obtained distance with a preset distance threshold. When the distance is smaller than the preset distance threshold, it is determined that the terminal 1000 is in the near state in relative to the external object, and the screen of the terminal 1000 is darkened. When the distance is not smaller than the preset distance threshold, it is determined that the terminal 1000 is in the far state in relative to the external object, and the screen of the terminal 1000 is lighted. Therefore, the power consumption of the terminal 1000 is reduced.

In some embodiments, the processor 800 may set a plurality of statuses according to the distance of the terminal 1000 in relative to the external object. For example, a first status is set when the distance is from 1 centimeter to 5 centimeters. A second status is set when the distance is from 6 centimeters and 10 centimeters. A third status is set when the distance is from 11 centimeters and 15 centimeters, and so on. The processor 800 is configured to set respective adjustment parameters for different statuses for adjusting the terminal. It is assumed that the adjustment parameter is a brightness value, the first status corresponds to the first brightness value, the second status corresponds to the second brightness value, the third status corresponds to the third brightness value, the first brightness value<the second brightness value<the third brightness value. As illustrated in FIG. 3, when a hand moves from a position A, to a position B and then to a position C, the processor 800 may increase a brightness value of the screen of the terminal gradually.

The terminal according to embodiments of the present disclosure employs a solution that by transmitting the detection signal through the bone-conduction acoustic generator, by receiving the reflection signal through the microphone, by obtaining the distance between the terminal and the external object according to the detection signal and the reflection signal, the status of the terminal in relative to the external object is determined. The screen-to-body ratio of the terminal is improved.

The method and the device for determining the status of the terminal and the terminal provided in embodiments of the present disclosure are described in detail. Individual functional modules may be integrated into one processing chip, or may be separately physically present, or two or more modules may be integrated in one module. The integrated module as described above may be achieved in the form of hardware, or may be achieved in the form of a software functional module. Particular embodiments are used to describe the principles and implementations of the present disclosure, the above descriptions to the embodiments are merely used to help to understand the method and core thought of the present disclosure. Moreover, for those skilled in the art, according to the thought of the present disclosure, the particular implementations and the application scopes may change. In conclusion, the disclosure of the specification shall not be understood as a limitation of the present disclosure.

What is claimed is:

1. A method for determining a status of a terminal, comprising:
   transmitting, by a bone-conduction acoustic generator, an ultrasonic detection signal outwards;
   receiving, by a microphone, a reflection signal of the ultrasonic detection signal reflected by an external object;
   obtaining a distance between the terminal and the external object according to the ultrasonic detection signal and the reflection signal of the ultrasonic detection signal; and
   determining the status of the terminal in relative to the external object based on the distance.

2. The method according to claim 1, wherein the status comprises a proximity status and a far status;
   determining the status of the terminal in relative to the external object based on the distance comprises:
   judging whether the distance is smaller than a preset distance threshold;
   when the terminal is in the proximity status in relative to the external object, and when the distance is smaller than the preset distance threshold; and
   shutting off a screen of the terminal; or
   when the terminal is in the far status in relative to the external object, and when the distance is not smaller than the preset distance threshold; and
   lighting on a screen of the terminal.

3. The method according to claim 2, before judging whether the distance is smaller than the preset distance threshold, further comprising:
   obtaining an application currently running in the terminal; and
   determining the preset distance threshold according to the application currently running in the terminal.

4. The method according to claim 1, wherein determining the status of the terminal in relative to the external object base on the distance comprises:
   obtaining a target status corresponding to the distance; and
   setting the status of the terminal in relative to the external object as the target status.

5. The method according to claim 4, after setting the status of the terminal in relative to the external object as the target status, further comprising:
   obtaining a brightness value corresponding to the target status; and
   adjusting a brightness value of a screen of the terminal to the brightness value corresponding to the target status.

6. The method according to claim 5, wherein a corresponding among distances, target statuses and brightness values is preset.

7. A terminal, comprising: a processor, a bone-conduction acoustic generator, a microphone, a cover plate and a housing;
   wherein the housing and the cover plate form an accommodating cavity, the bone-conduction acoustic generator and the microphone are arranged inside of the accommodating cavity;
   the bone-conduction acoustic generator is configured to transmit an ultrasonic detection signal outwards;
   the microphone is configured to receive a reflection signal of the ultrasonic detection signal reflected by an external object; and
   the processor is configured to determine a status of the terminal in relative to the external object according to the ultrasonic detection signal and the reflection signal of the ultrasonic detection.

8. The terminal according to claim 7, further comprising:
   a memory, stored with executable program codes;
   wherein the processor is configured to invoke the executable program codes stored in the memory to:
   obtain a distance between the terminal and the external object according to the detection signal and the reflection signal; and
   determine the status of the terminal in relative to the external object base on the distance.

9. The terminal according to claim 8, wherein the status comprises a proximity status and a far status; and the processor is configured to determine the status of the terminal in relative to the external object based on the distance by acts of:
   judging whether the distance is smaller than a preset distance threshold;
   when the terminal is in the proximity status in relative to the external object, and when the distance is smaller than the preset distance threshold; and
   shutting off a screen of the terminal; or
   when the terminal is in the far status in relative to the external object, and when the distance is not smaller than the preset distance threshold; and
   lighting on a screen of the terminal.

10. The terminal according to claim 9, wherein the processor is further configured to:
    obtain an application currently running in the terminal; and
    determine the preset distance threshold according to the application currently running in the terminal.

11. The terminal according to claim 8, wherein the processor is configured to determine the status of the terminal in relative to the external object based on the distance by acts of:
    obtaining a target status corresponding to the distance; and setting the status of the terminal in relative to the external object as the target status.

12. The terminal according to claim 11, wherein the processor is further configured to:
obtain a brightness value corresponding to the target status; and
adjust a brightness value of a screen of the terminal to the brightness value corresponding to the target status.

13. The terminal according to claim 12, wherein a corresponding among distances, target statuses and brightness values is preset in the memory.

14. A non-transitory computer-readable storage medium having stored therein instructions that, when executed by a processor of a device, causes the device to perform a method for determining a status of a terminal, the method comprising:
controlling a bone-conduction acoustic generator of the device to transmit an ultrasonic detection signal outwards;
controlling a microphone of the device to receive a reflection signal of the ultrasonic detection signal reflected by an external object;
obtaining a distance between the terminal and the external object according to the ultrasonic detection signal and the reflection signal of the ultrasonic detection signal; and
determining the status of the terminal in relative to the external object based on the distance.

15. The non-transitory computer-readable storage medium according to claim 14, wherein the status comprises a proximity status and a far status;
determining the status of the terminal in relative to the external object based on the distance comprises:
judging whether the distance is smaller than a preset distance threshold;
when the terminal is in the proximity status in relative to the external object, and when the distance is smaller than the preset distance threshold; and
shutting off a screen of the terminal; or
when the terminal is in the far status in relative to the external object, and when the distance is not smaller than the preset distance threshold; and
lighting on a screen of the terminal.

16. The non-transitory computer-readable storage medium according to claim 15, wherein before judging whether the distance is smaller than the preset distance threshold, the method further comprises:
obtaining an application currently running in the terminal; and
determining the preset distance threshold according to the application currently running in the terminal.

17. The non-transitory computer-readable storage medium according to claim 14, wherein determining the status of the terminal in relative to the external object according to the distance comprises:
obtaining a target status corresponding to the distance; and
setting the status of the terminal in relative to the external object as the target status.

18. The non-transitory computer-readable storage medium according to claim 17, wherein after setting the status of the terminal in relative to the external object as the target status, the method further comprises:
obtaining a brightness value corresponding to the target status; and
adjusting a brightness value of a screen of the terminal to the brightness value corresponding to the target status.

19. The non-transitory computer-readable storage medium according to claim 18, wherein a corresponding among distances, target statuses and brightness values is preset.

20. The method according to claim 1, wherein the bone-conduction acoustic generator is arranged at top of a smart phone and the microphone is arranged at bottom of a smart phone.

* * * * *